Dec. 22, 1964  D. L. HALL ETAL  3,162,325
CONSTANT RATE FEEDER
Filed April 12, 1961  5 Sheets-Sheet 1
Fig. I
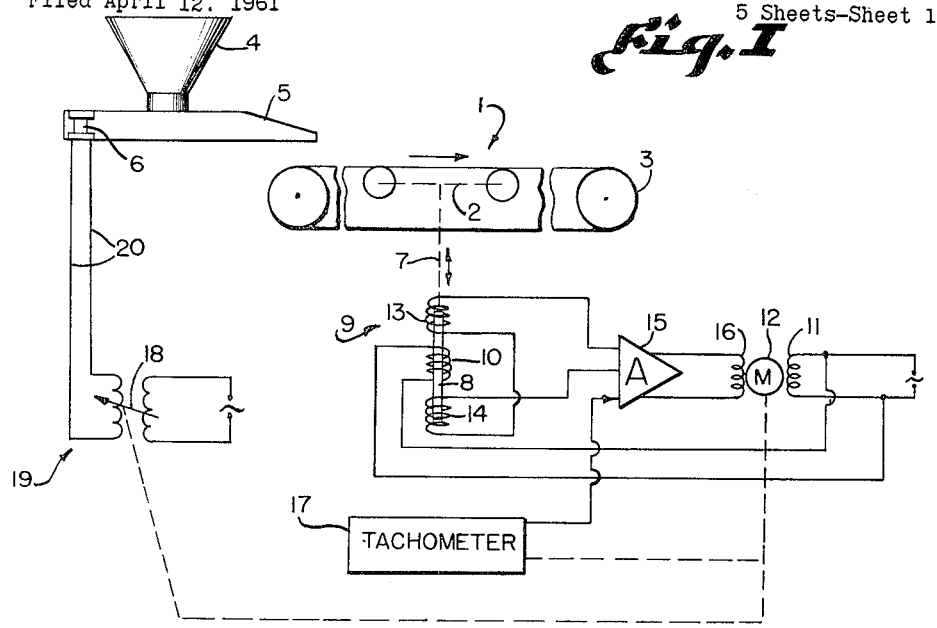
Fig. II
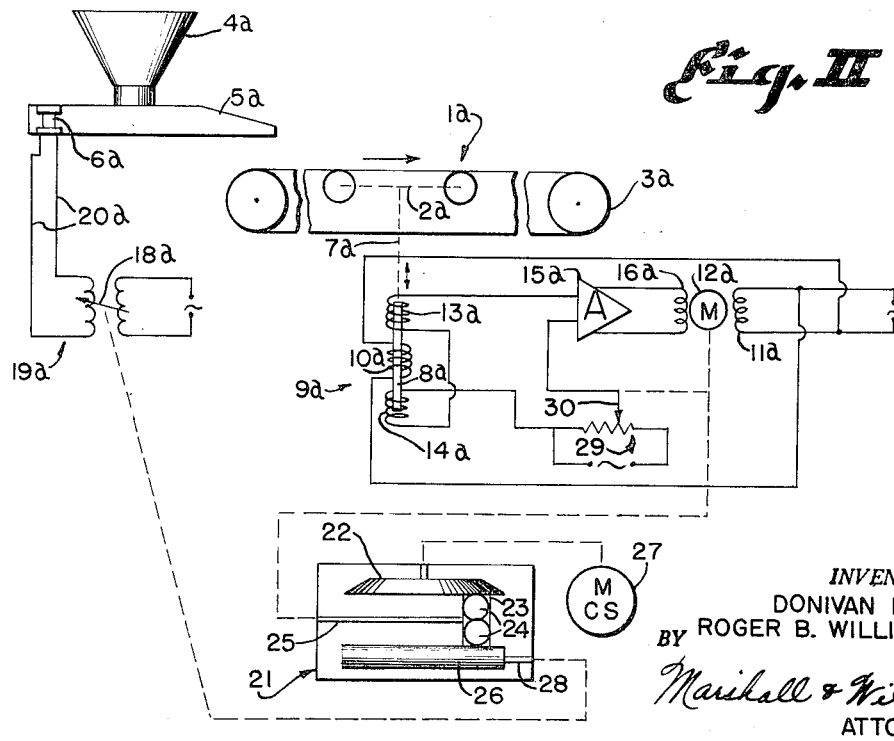
INVENTORS.
DONIVAN L. HALL
BY ROGER B. WILLIAMS JR.
*Marshall & Wilson*
ATTORNEYS

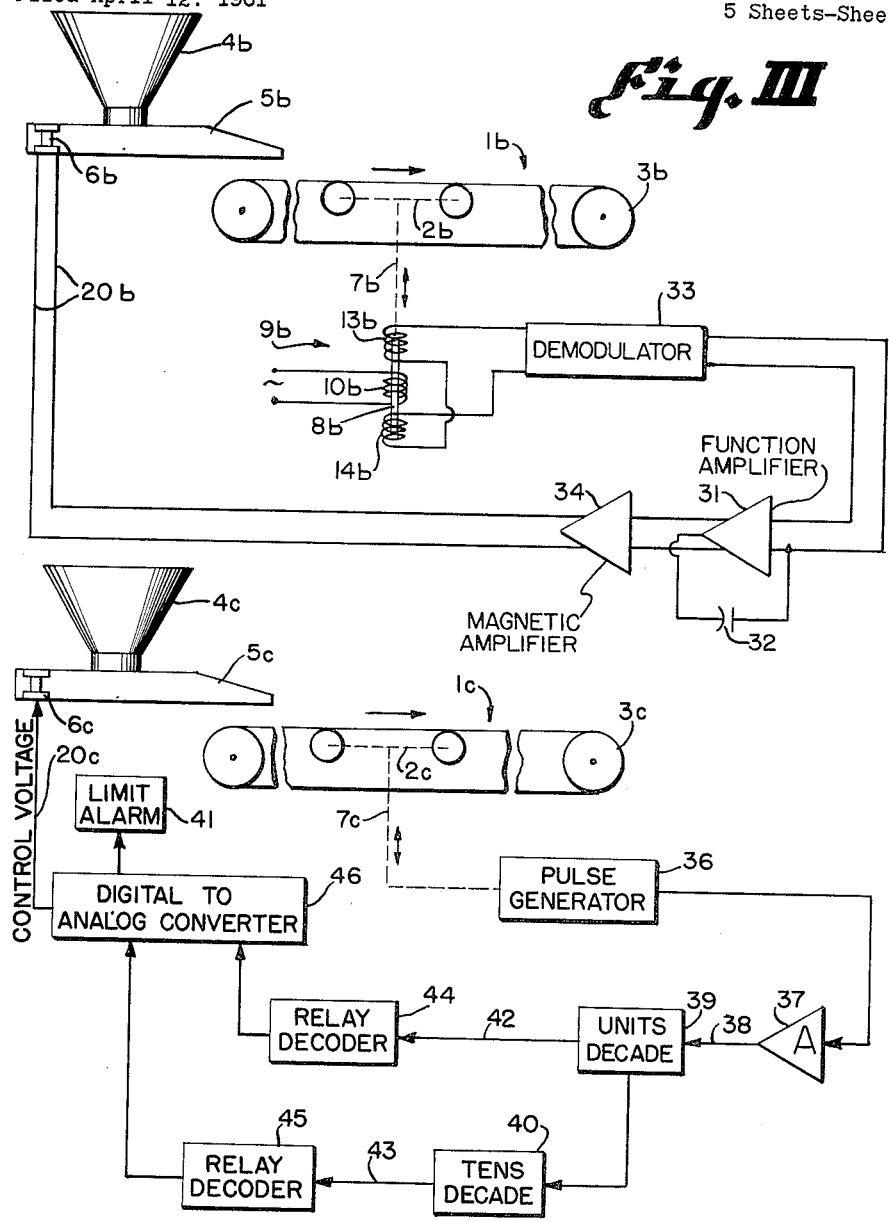

| 100 PULSES = STANDARD WEIGHT PER SCAN | |
|---|---|
| COUNTER READING | CONTROL VOLTAGE |
| 00 | 0 |
| 98 | -2 |
| 96 | -4 |
| 90 | -10 |
| 80 | -20 |
| 70 | -30 |
| 49 (MAXIMUM NEGATIVE EXCURSION) | -49 |
| 01 | +1 |
| 02 | +2 |
| 05 | +5 |
| 10 | +10 |
| 20 | +20 |
| 40 | +40 |
| 49 (MAXIMUM POSITIVE EXCURSION) | +49 |

*Fig. V*

| COUNTS | RELAYS | | | | X = ON |
|---|---|---|---|---|---|
| | A | B | C | D | |
| 0 | | | | | |
| 1 | X | | | | |
| 2 | | X | | | |
| 3 | X | X | | | |
| 4 | | X | X | | |
| 5 | X | X | X | | |
| 6 | | | X | X | |
| 7 | X | | X | X | |
| 8 | | X | X | X | |
| 9 | X | X | X | X | |

*Fig. VII*

INVENTORS.
DONIVAN L. HALL
ROGER B. WILLIAMS JR.
BY
Marshall & Wilson
ATTORNEYS

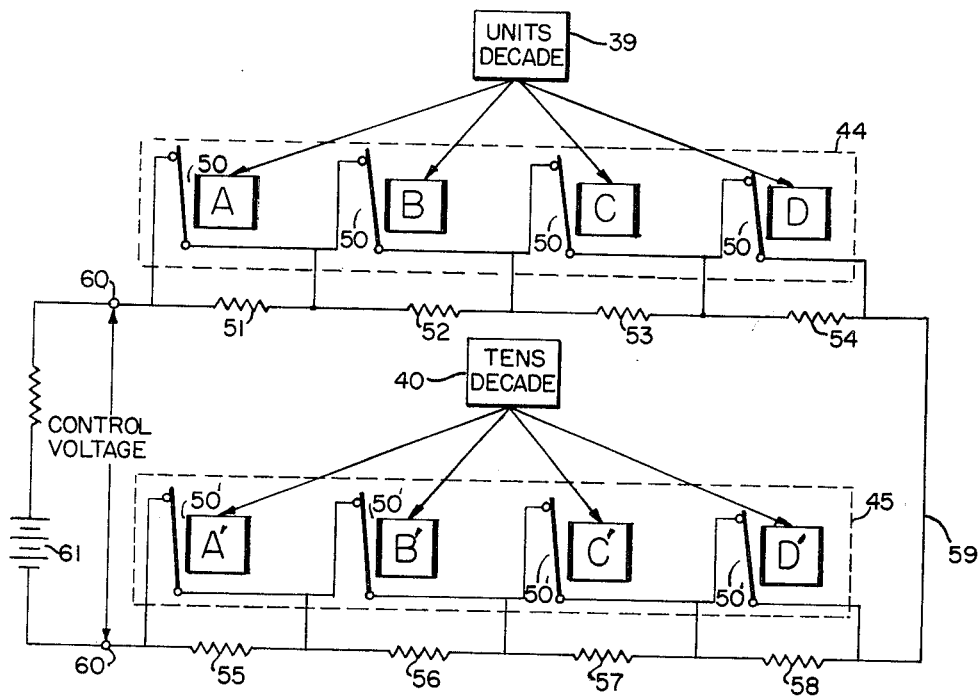
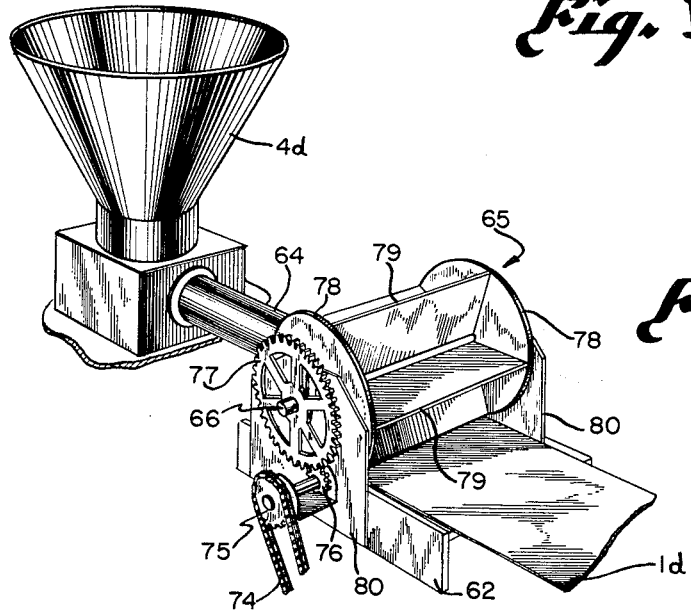
Fig. VI
Fig. IX
INVENTORS.
DONIVAN L. HALL
ROGER B. WILLIAMS JR.
BY
*Marshall & Wilson*
ATTORNEYS Dec. 22, 1964   D. L. HALL ETAL   3,162,325
CONSTANT RATE FEEDER
Filed April 12, 1961   5 Sheets-Sheet 5
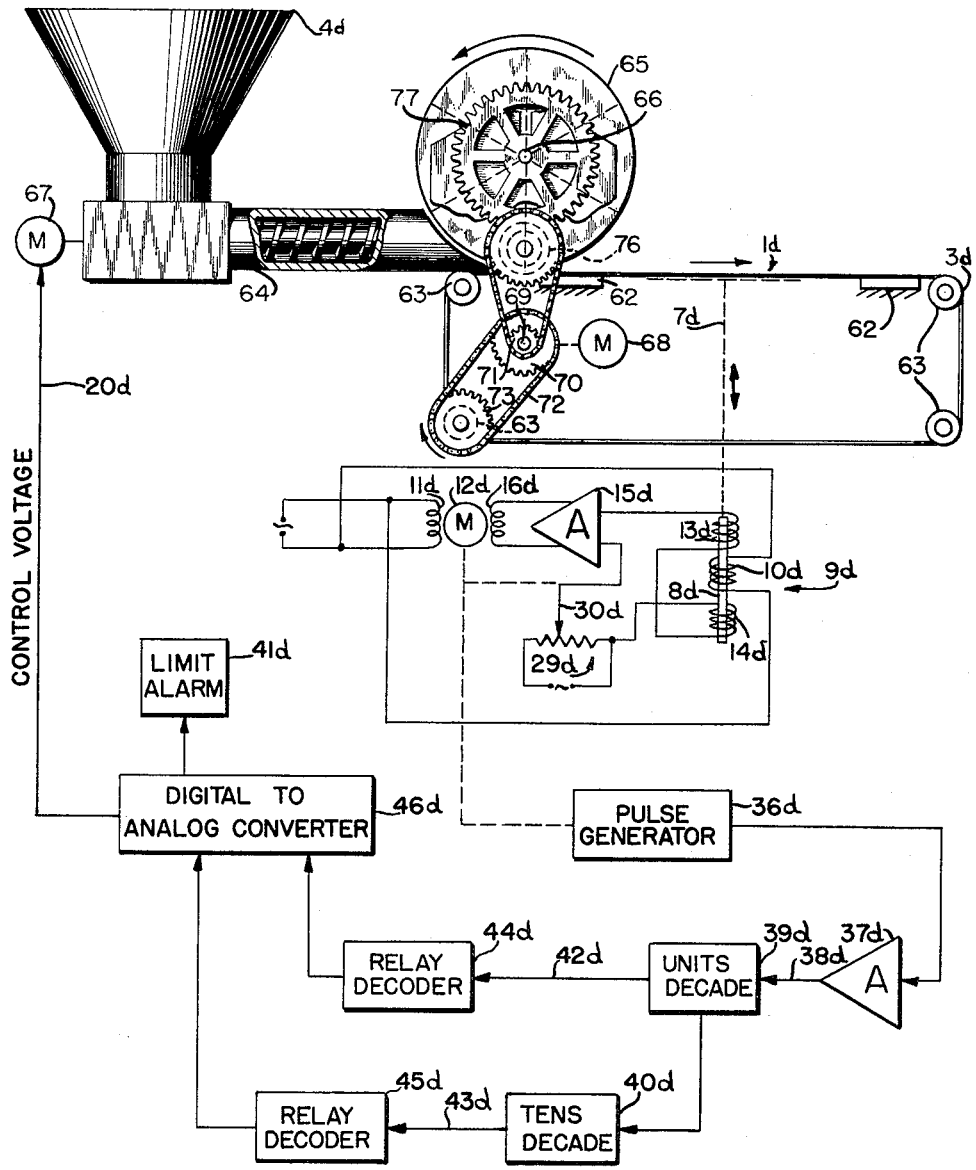
Fig. VIII
INVENTORS
DONIVAN L. HALL
ROGER B. WILLIAMS JR.
BY
Marshall & Wilson
ATTORNEYS United States Patent Office 3,162,325
Patented Dec. 22, 1964

3,162,325
CONSTANT RATE FEEDER
Donivan L. Hall and Roger B. Williams, Jr., Toledo, Ohio, assignors to Toledo Scale Corporation, Toledo, Ohio, a corporation of Ohio
Filed Apr. 12, 1961, Ser. No. 102,441
12 Claims. (Cl. 222—55)

This invention relates to constant rate feeders of the type comprising a conveyor carried on a weighing scale platform, a feeder for feeding materials, liquids or solids, into or onto the conveyor, and control mechanism for adjusting the feed rate of the feeder in accordance with the weight of the material in or upon the conveyor.

Heretofore, in constant rate feeders, the control mechanisms attempted to continuously adjust the feed rates of the feeders, such as vibratory or worm or pump feeders, to maintain constant weights upon or in the conveyors, such as belt or pipe conveyors. Such a system suffers from disadvantages. For example, in a system handling solid materials, not only is the discharge from the feeder onto the conveyor belt subject to fluctuation because of lumpy characteristics of many materials but also the apparent weight of the materials varies erratically as the lumps fall off the discharge end of the belt. This tends to promote a hunting action, since as a lump or a chunk falls onto the belt from the feeder, the feeder immediately starts feeding at a lower rate until a deficiency at the lower rate equals the lump. Then as the lump falls off the discharge end of the belt the feeder puts on a heavier than average amount of material which in turn then requires a lesser rate as the material supplied to the belt at the original lesser rate drops off the discharge end of the belt. Accordingly, the prior feeders, at least when feeding lumpy materials, never succeeded in feeding at a constant rate.

Accordingly, the objects of this invention are to improve constant rate feeders and to increase the precision of such feeders.

One embodiment of this invention enabling the realization of these objects is a combination of a belt conveyor carried on a weighing scale platform and driven at a constant speed, a feeder for feeding material onto the conveyor belt, a linear differential transformer or similar transducer for detecting the amount by which the load on the conveyor belt departs from the desired load, mechanism for integrating with respect to time the signal from the linear differential transformer or its equivalent, and means for controlling the feed rate of the feeder in accordance with the output of the integrating mechanism.

In accordance with the above, the principal feature of this invention resides in that the integrating mechanism, which is connected between the transducer and the feeder, in effect introduces a memory element which remembers the absolute magnitude of the errors in weight on the conveyor belt, averages those errors and corrects the feed rate according to the remaining averaged error rather than trying to completely correct each of the individual errors as is done in the prior feeders. As long as the weighing scale response is much faster than the belt speed, so that the scale is actually weighing each increment of load for an appreciable time interval longer than the scale period, the system is stable and does not tend to hunt. Hence, the constant rate feeder of the invention continuously remembers the instantaneous errors in feed rate and adjusts the feed rate to minimize or eliminate the average error.

The above and other objects and features of this invention will be appreciated more fully from the following detailed description when read with reference to the accompanying drawings wherein:

FIG. I is a diagrammatic representation of one form of a constant rate feeder according to this invention showing a schematic wiring diagram of control mechanism for such feeder;

FIG. II is a diagrammatic representation of a second form of a constant rate feeder;

FIG. III is a diagrammatic representation of a third form of a constant rate feeder;

FIG. IV is a diagrammatic representation of a fourth form of a constant rate feeder;

FIG. V is a table which in conjunction with FIG. IV helps explain the operation of the constant rate feeder illustrated in FIG. IV;

FIG. VI is a schematic wiring diagram showing several of the elements illustrated in FIG. IV in detail;

FIG. VII is a table which helps explain the operation of the circuitry shown in FIG. VI;

FIG. VIII is a diagrammatic representation of a fifth form of a constant rate feeder; and FIG. IX is a fragmentary perspective view of part of the mechanism shown in FIG. VIII.

Referring to the drawings, in FIG. I a conveyor belt 1 is driven at a constant speed in the direction indicated by the single-ended arrow and has a central portion carried on a weighing scale platform 2. Material to be delivered at a constant rate from the discharge end 3 of the conveyor belt 1 is stored in a hopper 4 and fed by a vibratory feeder 5 onto the left hand end of the conveyor belt 1 as viewed in FIG. I. The vibratory feeder 5 is operated by means of an operating motor 6. Any suitable conveyor can be substituted for the belt 1. For example, a worm conveyor can be carried by the scale platform, solid materials being conveyed by the worm which is motor driven, or a flexible pipe can be carried by the scale platform, liquid materials being forced through the pipe by means of a pump. The platform 2 is so connected by mechanical linkage 7 to the armature 8 of a linear differential transformer 9 that the armature is axially movable in response to movements of the platform under loads thereon. The linear differential transformer 9 functions to detect the amount by which load on the conveyor belt 1 departs from the desired load. Any suitable transducer can be substituted for the linear differential transformer 9 as long as the transducer detects deviation from the desired load. Accordingly the platform 2 is part of a weighing scale which can be characterized as an over-under scale.

The conveyor belt 1 and the weighing scale platform 2 are not shown in detail because conveyor weighing scales are basically old. An example of such a scale is disclosed in U.S. Patent No. 2,918,269, issued December 22, 1959, to R. B. Williams, Jr. The instantaneous weight of material upon the scale disclosed in the above patent is detected by a strain gage load cell transducer. Examples of weighing scales wherein linear differential transformers have their movable parts driven by weighing scale mechanisms are disclosed in U.S. Patent No. 2,918,246, issued December 22, 1959, to R. E. Bell, and in U.S. Patent No. 2,960,925, issued November 22, 1960, to R. O. Bradley. The structures of the linear differential transformers shown and described in the above patents are similar to the structure of the linear differential transformer 9. However, the armatures of the differential transformers shown and described in the above patents are so positioned that, when there is no load upon the scales, there is no output from the transformers, whereas the armature 8 of the transformer 9 is so positioned (by trial and error while suitable test weights are upon the platform 2) that, when the conveyor belt 1 is delivering the desired weight of material, there is no output from the transformer 9. Hence, the differential transformers shown and described in the above patents detect the weights of materials upon the scales, whereas the differential transformer 9 detects the amount by which load upon the conveyor belt 1 departs from the desired load, i.e., deviation from the desired load.

The linear differential transformer 9 also includes a centrally disposed exciting coil or primary 10 in circuit with a source of alternating current, indicated in FIG. I. One field 11 of a servo motor 12 is also in circuit with the same source of alternating current. The transformer 9 is also provided with the opposed, series-connected secondary coils 13 and 14 leading to an amplifier 15. The output of the amplifier 15 leads to the other field 16 of the servo motor 12. Whenever load upon the platform 2 departs from the desired load, the armature 8 is moved effecting a magnetic unbalance of the transformer 9 in one sense and producing an A.C. signal output delivered as an input to the amplifier 15. This small A.C. signal is then amplified and applied to the field 16 of the servo motor 12. As the output of the secondaries is in amplitude a function of the degree of unbalance and in phase a function of the sense of unbalance, the signal current to the field 16 leads or lags the current in the field 11 by 90 degrees, and the servo motor 12 runs in the proper predetermined direction with its speed proportional to the amplitude of the output of the secondaries. This means that the motor speed reduces as the unbalance of the transformer 9 decreases, and the motor stops when the transformer becomes balanced and the output of the secondaries becomes substantially nil. The transformer 9 becomes balanced by the correct addition of material to the platform 2 by means hereinafter described.

The servo motor 12 is mechanically connected, as indicated in FIG. I, to a tachometer 17 and to the slider 18 of a variable transformer 19 (Variac). The output voltage of the tachometer 17 is proportional to the speed of the servo motor 12 and this voltage is applied to the amplifier 15, as indicated in FIG. I, to force the amplifier 15 and the servo motor 12 to be linear. That is, the amplifier 15, servo motor 12 and tachometer 17 make up an integrator having a response which is linear relative to the weighing scale reading, i.e., linear relative to weight deviation from the desired weight. The integrator integrates with respect to time the signal from the linear differential transformer 9 to, in effect, introduce a memory element which remembers the absolute magnitude of the errors in weight on the platform 2, averages those errors and corrects the feed rate, by means of the connection between the servo motor 12 and the slider 18 of the variable transformer 19, according to the remaining averaged error rather than trying to completely correct each of the individual errors as is done in the feeders of the prior art.

The position of the slider 18 of the variable transformer 19, accordingly, is proportional to the integral of the weight deviation and time. The variable transformer 19, which is connected to the operating motor 6 of the vibratory feeder 5 by means of leads 20, supplies control voltage to such motor 6 which control voltage varies to control the speed of the motor 6 in accordance with the position of the slider 18. This controls the feed rate of the vibratory feeder 5 in accordance with the output of the integrator, the integrator being the combination of the amplifier 15, the servo motor 12 and the tachometer 17. The principal feature of the constant rate feeder of the invention resides in continuously remembering the instantaneous errors in feed rate and adjusting the feed rate to minimize or eliminate the average error. This is in contrast to trying to completely correct each of the individual errors as is done in the prior feeders.

The platform 2 is part of a weighing scale which as above characterized is an over-under scale. This is a mass balance system. The desired weight of material on the scale platform 2 is balanced by, for example, a balance weight poise and any deviation from such desired weight is detected by the linear differential transformer 9. The weight deviation signal from the linear differential transformer 9 is integrated with respect to time by the integrator which positions the slider 18 of the variable transformer 19 according to the integral of the weight deviation and time. This controls the feed rate of the vibratory feeder 5 in accordance with the output of the integrator. Accordingly, the vibratory feeder 5 delivers a flow of material to the conveyor belt 1 such that the material is delivered at a constant rate from the discharge end 3 of the conveyor belt 1.

Hence, a control system is provided wherein the integral of the deviation from standard flow rate is used to control flow rate. The advantage of such control system is that short time errors in the flow rate are remembered by the integrator and are corrected ultimately. This results in a highly accurate measurement of total material passed in a given time interval, provided the interval is long compared to the transient response of the system.

A modification of the constant rate feeder is illustrated in FIG. II. Similar reference numbers in FIGS. I and II refer to parts which are alike in structure and in function. The modified constant rate feeder employs a mechanical ball and disk integrator 21 to integrate the weight deviation signal from the linear differential transformer 9a with respect to time. The ball and disk integrator 21 is like the one shown and described in the above U.S. Patent No. 2,918,269.

The integrator 21 includes a rotatably mounted disk 22 and a ball cage 23 containing a pair of balls 24, the ball cage 23 being fixed to the end of an input shaft 25 mechanically connected to the servo motor 12a, as indicated in FIG. II. One of the balls 24 is constantly in rolling contact with the plane surface of the disk 22 and the other of the balls 24 is constantly in rolling contact with the periphery of a cylinder 26, the balls also being in constant rolling contact with each other.

The input shaft 25 and the ball cage 23 fixed thereto are positioned in accordance with any weight deviation by the servo motor 12a. The disk 22, which is mechanically connected to a constant speed motor 27, as indicated in FIG. II, that is adjusted to the desired feed rate, is rotated by the constant speed motor 27. Alternatively, the disk 22 can be rotated at a speed proportional to the speed of the conveyor belt 1a by means disclosed in the above U.S. Patent No. 2,918,269. The disk 22 friction drives the cylinder 26, fixedly attached to an output shaft 28, at a speed depending both upon the speed of rotation of the disk 22 and upon the distance (radius) that the ball cage 23 is located from the center of the disk 22. Hence, the integrator output shaft 28 is turned according to the weight deviation signal from the unbalanced linear differential transformer 9a integrated with respect to time. The transformer 9a becomes balanced by the correct addition of material to the scale platform 2a by means hereinafter described. The integrator output shaft 28 is mechanically connected to the slider 18a of the variable transformer 19a to position the slider 18a according to the integral of the weight deviation and time. This controls the feed rate of the vibratory feeder 5a in accordance with the output of the integrator 21.

The electrical circuit shown in FIG. II is generally similar to the electrical circuit shown in FIG. II in the above U.S. Patent No. 2,918,269. Output voltage from the unbalanced linear differential transformer 9a opposes the output voltage from a potentiometer 29 having a slider 30 mechanically connected to the servo motor 12a to determine the input to the amplifier 15a. An unbalance of the output voltages results in operation of the servo motor 12a to position both the ball cage 23 and the slider 30 until the opposing voltages are equal. When the opposing voltages are equal, input voltage to the amplifier 15a is restored to null. Whenever the linear differential transformer 9a detects deviation from the desired load, the resulting output from the transformer 9a is applied as an input to the amplifier 15a until the servo motor 12a moves the potentiometer slider 30 to reduce the input to the amplifier 15a to nil. At the same time, while the servo motor 12a is moving the potentiometer slider 30, it also moves the ball cage 23 in accordance with such weight deviation from the desired load. This weight deviation is integrated with respect to time by the integrator 21 to control the feed rate of the vibratory feeder 5a in accordance with the integral of the weight deviation and time. Accordingly, the vibratory feeder 5a delivers a flow of material to the conveyor belt 1a such that the material is delivered at a constant rate from the discharge end 3a of the conveyor belt 1a.

Another modification of the constant rate feeder is illustrated in FIG. III. Similar reference numbers in FIGS. I–III refer to parts which are alike in structure and in function. The modified constant rate feeder employs a function amplifier 31, having a capacitor 32 across it, to integrate the weight deviation signal from the linear differential transformer 9b with respect to time. The amplifier 31 is of a type common in analog computers; it has a high, stable gain with an output which is the time integral of input. For example, with an input of one volt to the amplifier 31 a graph of the output shows a straight line rising to infinity; if the input is increased to two volts, the slope of the line is increased, but it still rises to infinity.

Whenever load upon the scale platform 2b departs from the desired load, the armature 8b is moved effecting a magnetic unbalance of the linear differential transformer 9b producing an A.C. singal output delivered as an input to a demodulator 33. This small A.C. signal is then changed to a plus or minus D.C. signal and delivered as an input to the function amplifier 31. The output (time integral of input) from the amplifier 31 is applied to a magnetic amplifier 34 which produces an A.C. signal to control the vibrator motor 6b, the magnetic amplifier 34 being connected to the vibrator motor 6b by the leads 20b. The magnetic amplifier 34 is a power driver stage for the vibratory feeder 5b. This controls the feed rate of the vibratory feeder 5b in accordance with the output of the integrator, i.e., the function amplifier 31. Accordingly, the vibratory feeder 5b delivers a flow of material to the conveyor belt 1b such that the material is delivered at a constant rate from the discharge end 3b of the conveyor belt 1b.

Another modification of the constant rate feeder is illustrated in FIG. IV. Similar reference numbers in FIGS. I–IV refer to parts which are alike in structure and in function. The constant rate feeders shown in FIGS. I–III each are mass balance systems wherein the desired weight of material on the scale platform is balanced by, for example, a balance weight poise and any deviation from such desired weight is detected by the linear differential transformer. In contrast, in the constant rate feeder shown in FIG. IV, the full weight of the material on the scale platform 2c is detected and deviation measurement from the desired weight is achieved by means of subsequent circuitry. A deviation error voltage can be produced by means of subsequent circuitry as disclosed in U.S. application Serial No. 816,987, filed May 29, 1959, now Patent No. 3,106,974, in the name of R. B. Williams, Jr., disclosing weighing scale mechanism wherein a full output voltage from a scale transducer is compared with a selectively adjustable reference voltage, the difference being a voltage which is proportional to weight deviation from a desired load upon the scale. A deviation error voltage as illustrated in FIG. IV.

voltage also can be produced by means of subsequent circuitry as illustrated in FIG. IV.

The scale platform 2c is mechanically connected to a pulse generator 36 which produces a series of pulses proportional in number to the weight of material upon the platform 2c. The pulse generator 36 is disclosed in detail in U.S. application Serial No. 592,932, filed June 21, 1956, now Patent No. 3,055,585, in the names of R. E. Bell and R. B. Williams, Jr. In brief, the pulse generator includes a mask, which is indicated by the broken line in FIG. IV to be operatively connected to the scale platform 2c, that is adapted to expose portions of a stationary graduated chart. The mask is thus a movable weight responsive member along the path of which extends a stationary chart having graduations that are variably exposed according to the position of the mask. A photoelectric scanner employs moving optical projection elements such that a light path is arranged to sweep over the exposed portion of the chart and generate photoelectric pulses corresponding to the number of exposed graduations. Hence, the pulse generator 36 produces a series of pulses for each scan of the scanner proportional in number to the weight of material upon the scale platform 2c. These pulses are transmitted to an amplifier 37. Accordingly, the full weight of the material on the scale platform 2c is detected. The scanning frequency is chosen commensurate with desired system response. The mask is so arranged that when the desired weight is on the scale platform 2c one hundred chart graduations are exposed. Accordingly, one hundred pulses per scan indicates that the desired weight is on the scale platform 2c.

The amplifier delivers to a counter lead 38 one amplified pulse for each pulse received from the pulse generator 36. These pulses on the counter lead 38 are fed to a units decade 39 of a modified binary type counter which is composed of two decades including the decade 39 and a decade 40 adapted to register the units and tens places, respectively, of the weight indication read by the pulse generator 36. Such counter decades connected to such a pulse generator are disclosed in the above U.S. application Serial No. 592,932. The counter decades 39 and 40 never are reset. The maximum counting capacity of the counter composed of the decades 39 and 40 is 99 counts.

While the desired weight of material is upon the scale platform 2c, one hundred pulses per scan are fed to the counter which registers 00 as indicated in the table in FIG. V. As also indicated in such table, a counter reading of 00 produces a control voltage of 0. Means for producing such control voltage are described hereinafter. The control voltage is applied as indicated in FIG. IV to the vibrator motor 6c to control the feed rate of the vibratory feeder 5c which rate remains unchanged when the control voltage is 0.

Whenever the weight of material upon the scale platform 2c is less than the desired weight, less than one hundred pulses per scan are fed to the counter. When the counter registers 98, for example, a control voltage of minus 2 volts is produced, when the counter registers 96, a control voltage of minus 4 volts is produced, etc., as shown in the table. The maximum negative counter reading is 49 producing a control voltage of minus 49 volts. If the system goes beyond that it is out of control and a limit alarm 41 is operated by means hereinafter described. Ordinarily, the system does not go out of control because the control voltage is applied to the vibrator motor 6c controlling the feed rate of the vibratory feeder 5c which responds to the negative control voltage by increasing the feed rate to automatically bring the counter reading back to 00.

Whenever the weight of material upon the scale platform 2c is more than the desired weight, more than one hundred pulses per scan are fed to the counter. When the counter registers 01, for example, a control voltage of plus 1 volt is produced, when the counter registers 02, a control voltage of plus 2 volts is produced, etc., as shown in the table. The maximum positive counter reading is 49 producing a control voltage of plus 49 volts. If the system goes beyond that it is out of control and the limit alarm 41 is operated. Ordinarily, the system does not go out of control because the control voltage is applied to the vibrator motor 6c controlling the feed rate of the vibratory feeder 5c which responds to the positive control voltage by decreasing the feed rate to automatically bring the counter reading back to 00.

Binary control signals are delivered by the counter decades 39 and 40 to leads 42 and 43, respectively. The signals on the leads 42 and 43 are fed to relay decoders 44 and 45, respectively. The decoders which comprise relays accept binary inputs and open contacts in accordance with such inputs. The decoders 44 and 45 are in circuit with a digital to analog converter 46 which produces the control output voltage. The converter 46 also produces a signal to operate the limit alarm 41 whenever counter readings beyond the above maximum and negative excursions occur.

The decades 39 and 40 of the binary type counter are of conventional construction, each having four flip-flop stages. The flip-flop stages of the units decade 39 are indicated to be in circuit with relays A, B, C and D in FIG. VI. Hence, when the flip-flop associated with relay A is on, the coil of relay A is energized, when the flip-flop associated with relay B is on, the coil of relay B is energized, etc. In accordance with the binary system of counting, as shown in FIG. VII, when there is a count of zero in the units decade 39, none of the relays are on, when there is a count of one in the units decade 39, relay A is on, etc. Similarly, the flip-flop stages of the tens decade 40 are indicated to be in circuit with relays $A^1$, $B^1$, $C^1$ and $D^1$ in FIG. VI and when the flip-flop associated with relay $A^1$ is on, the coil of relay $A^1$ is energized, when the flip-flop associated with relay $B^1$ is on, the coil of relay $B^1$ is energized, etc. Also, similarly, when there is a count of zero in the tens decade 40, none of the relays are on, when there is a count of one in the tens decade 40, relay $A^1$ is on, etc. As indicated in FIG. VI, the relay decoder 44 comprises the relays A, B, C and D and the relay decoder 45 comprises the relays $A^1$, $B^1$, $C^1$ and $D^1$. Accordingly, the decoders 44 and 45 accept binary inputs and open normally closed relay contacts 50 and $50^1$ in accordance with such inputs.

Each of the relay contacts 50 and $50^1$ is across a resistor. Example values of such resistors are Resistor 51 associated with relay A = 10 ohms
Resistor 52 associated with relay B = 20 ohms
Resistor 53 associated with relay C = 20 ohms
Resistor 54 associated with relay D = 40 ohms
Resistor 55 associated with relay $A^1$ = 100 ohms
Resistor 56 associated with relay $B^1$ = 200 ohms
Resistor 57 associated with relay $C^1$ = 200 ohms
Resistor 58 associated with relay $D^1$ = 400 ohms When the normally closed relay contacts 50 and $50^1$ are closed, the resistors 51–58 are short circuited. However, when an energized relay coil causes its contacts to open, the resistor associated therewith is in effect inserted in a circuit 59 which includes the resistors 51–58 connected together in series. Resistors 51–58 are included in the digital to analog converter 46 (FIG. IV). Accordingly, the resistors 51–58 are inserted into the circuit 59 in accordance with the binary inputs accepted by the relay decoders 44 and 45. With a counter reading of 00 and using resistors having the above values, the total resistance in the circuit 59 is 0 ohm, with a counter reading of 09, the total resistance in the circuit 59 is 90 ohms, with a counter reading of 19, the total resistance in the circuit 59 is 190 ohms, with a counter reading of 99, the total resistance in the circuit 59 is 990 ohms, etc. Terminals 60 of the circuit 59 are connected to a battery 61 and accordingly the voltage between such terminals 60 varies in accordance with the total resistance in the circuit 59, which resistance in turn varies in accordance with the count in the counter. Such voltage between the terminals 60 is indicated as "Control Voltage" in FIG. IV and is shown to vary with the counter readings in FIG. V, hereinbefore described.

The control voltage produced by the converter 46 is applied to the vibrator motor 6c to control the feed rate of the vibratory feeder 5c. The time which enters into the integral comes from the time of scan of the scanner. A weight deviation error signal is produced by the counter decades 39 and 40 (any counter reading above or below 00 represents weight deviation), this signal being integrated with respect to time to control the feed rate of the vibratory feeder 5c according to the time integral. Accordingly, the vibratory feeder 5c delivers a flow of material to the conveyor belt 1c such that the material is delivered at a constant rate from the discharge end 3c of the conveyor belt 1c.

Another modification of the constant rate feeder is illustrated in FIGS. VIII and IX. Similar reference numbers in FIGS. I–IX refer to parts which are alike in structure and in function. The constant rate feeder shown in FIGS. VIII and IX is a mass balance system like those shown in FIGS. I–III wherein deviation from the desired weight of material on the scale platform is detected by a linear differential transformer.

A conveyor belt 1d which is supported by spaced stationary members 62 and which runs around rollers 63 is driven at a constant speed in the direction indicated by the horizontal arrow in FIG. VIII and has a central portion carried by a weighing scale platform 2d. Material to be delivered at a constant rate from the discharge end 3d of the belt is stored in a hopper 4d and fed by a screw or worm feeder 64 into a vane feeder 65 mounted on a rotatable shaft 66. The worm feeder is driven by means of a variable speed D.C. drive motor 67 and the vane feeder is driven by means of a motor 68 which also drives the conveyor belt 1d. The motor 68 drives a shaft 69 which in turn drives two sprocket wheels 70 and 71. A chain 72 runs around sprocket wheel 70 and around a sprocket wheel 73 which turns as one with one of the rollers 63 to drive the conveyor belt 1d. A chain 74 runs around sprocket wheel 71 and around a sprocket wheel 75 mounted to turn as one with a gear 76 meshing with a gear 77 carried on the shaft 66. The gear 77 drives the vane feeder 65 which rotates counterclockwise as viewed in FIG. VIII with a surface speed that is the same as that of the belt 1d. The vane feeder 65 feeds the material onto the left hand of the belt 1d as viewed in FIG. VIII. The platform 2d is so connetced by mechanical linkage 7d to the armature 8d of a linear differential transformer 9d that the armature is axially movable in response to movements of the scale platform under changes in loads thereon.

Output voltage from the unbalanced linear differential transformer 9d opposes the output voltage from a potentiometer 29d having a slider 30d mechanically connected to a servo motor 12d to determine the input to an amplifier 15d. An unbalance of the output voltages results in operation of the servo motor 12d to position both the slider 30d and the mask in a pulse generator 36d until the opposing voltages are equal. This servo system is the same as that described above in connection with FIG. II. A similar pulse generator with movable mask is described above in connection with FIG. IV. The pulse generator 36d is a part of a system, including amplifier 37d, decades 39d and 40d, decoders 44d and 45d, and converter 46d, which produces a control voltage in the same way that the control voltage is produced by means of the system shown in FIG. IV. The control voltage produced by the converter 46d is applied to the variable speed D.C. drive motor 67 to control the feed rate of the worm feeder 64 in accordance with the integrator output.

A feature of the constant rate feeder shown in FIGS. VIII and IX resides in the combination of the screw or worm feeder 64 with the vane feeder 65. The worm feeder 64 which runs full of the material to be delivered is an extruder which delivers such material in an irregular pattern. Accordingly, the worm feeder 64 does not adjust the next increment delivered therefrom after a change in worm rate correctly. The vane feeder 65 is in the form of a paddle wheel comprising a pair of round sides 78 (FIG. IX) spaced by six vanes 79 spaced sixty degrees apart around the axis of the rotatable shaft 66 and mounted on the shaft 66 journaled in upstanding side plates 80 one of which also mounts the sprocket wheel 75 and the gear 76. The side plates 80 in turn are carried by one of the stationary belt support members 62. The outer cylindrical shell of the worm feeder 64 is shaped as shown in FIG. VIII to conform to the outer curve of the round paddle wheel juxtaposed thereto, the worm feeder 64 extruding the material into the paddle wheel. The paddle wheel rotates counterclockwise continuously with a surface speed that is the same as that of conveyor belt 1d and spaces the material at regular intervals on the belt, i.e., the paddle wheel produces a regular pattern in contrast to the irregular pattern produced by the worm feeder. Hence, the combination of the worm feeder with the vane feeder produces a feeder wherein the next increment after a change in worm rate is adjusted correctly.

It is to be understood that the above description is illustrative of this invention and that various modifications thereof can be utilized without departing from its spirit and scope.

Having described the invention, we claim:

1. A constant rate feeder comprising, in combination, an over-under weighing scale platform, a conveyor for carrying material continuously across the platform, transducer means for detecting weight deviation from a desired weight of the material upon the platform, means for averaging instantaneous weight errors, and a feeder, having a feeding rate controlled by the averaging means in accordance with remaining averaged error, for feeding the material onto the conveyor.

2. In a constant rate feeder having an over-under weighing scale platform, in combination, a short run conveyor belt carried by the platform and driven at a constant speed, a feeder for feeding material onto the belt, a transducer for detecting the amount by which load upon the belt departs from the desired load and for producing a signal proportional to such amount, integrating mechanism for integrating with respect to time the signal from the transducer, and means for controlling the feed rate of the feeder in accordance with the output of the integrating mechanism.

3. A constant rate feeder comprising, in combination, an over-under weighing scale platform, a conveyor for carrying material continuously across the platform, transducer means for producing a signal proportional to the weight deviation from a desired weight of the material upon the platform, integrating means for integrating the signal from the transducer means with respect to time to produce an output which is the integral of the weight deviation and time, the integrating means including an amplifier and amplifying the signal from the transducer means, a servo motor in circuit with the amplifier and to which the amplified signal is applied and a tachometer driven by the servo motor producing a signal proportional to the speed of the servo motor, the signal from the tachometer being applied to the amplifier whereby the output of the integrating means is linear relative to the signal from the transducer means, a feeder for feeding material onto the conveyor, and means driven by the servo motor for controlling the feed rate of the feeder in accordance with the output of the integrating means.

4. A constant rate feeder comprising, in combination, an over-under weighing scale platform, a conveyor for carrying material continuously across the platform, transducer means for producing a signal proportional to the weight deviation from a desired weight of the material upon the platform, mechanical integrating means, servo means for applying an input to the integrating means in accordance with the signal from the transducer means, means for applying a time input to the integrating means, whereby the integrating means produces an output which is the integral of the weight deviation and time, a feeder for feeding material onto the conveyor, and means operatively connected to the integrating means for controlling the feed rate of the feeder in accordance with the output of the integrating means.

5. A constant rate feeder comprising, in combination, an over-under weighing scale platform, a conveyor for carrying material continuously across the platform, transducer means for producing a signal proportional to the weight deviation from a desired weight of the material upon the platform, function amplifier means in circuit with the transducer means for integrating the signal from the transducer means with respect to time, a feeder for feeding material onto the conveyor, and means in circuit with the amplifier means for controlling the feed rate of the feeder in accordance with the output of the amplifier means.

6. A constant rate feeder comprising, in combination, a weighing scale platform, a conveyor for carrying material continuously across the platform, means for producing a signal which is the time integral of weight deviation from a desired load upon the platform, a feeder including juxtaposed worm and vane feeders, the worm feeder feeding the material into the vane feeder and the vane feeder feeding such material onto the conveyor, and means for controlling the feed rate of the worm feeder in accordance with the signal.

7. A constant rate feeder comprising, in combination, delivery means for delivering material, feeding means for feeding the material to the delivery means, means for producing a digital signal which is proportional to the time integral of weight deviation from a desired weight of the material upon the delivery means, and digital to analog converting means for controlling the feed rate of the feeding means in accordance with said digital signal.

8. A constant rate feeder according to claim 7 wherein the means for producing a digital signal includes a transducer detecting said weight deviation.

9. A constant rate feeder according to claim 7 wherein the means for producing a digital signal includes detecting means for detecting the weight of the material upon the delivery means and means in circuit with the detecting means for detecting said weight deviation.

10. A constant rate feeder according to claim 7 wherein the means for producing a digital signal includes pulse generating means having a movable input member operatively connected to the delivery means and for producing a series of pulses proportional in number to the weight of material upon the delivery means and counting means in circuit with the pulse generating means for producing said digital signal which is the time integral of deviation of the number of pulses received from the pulse generating means from a desired number of pulses.

11. A constant rate feeder according to claim 7 wherein the means for producing a digital signal includes servo means, transducer means for producing an analog signal proportional to deviation from a desired weight of the material upon the delivery means and for applying the analog signal to the servo means, pulse generating means having a movable input member operatively connected to the servo means and positioned in accordance with the analog signal, the pulse generating means producing a series of pulses proportional in number to the analog signal, and counting means in circuit with the pulse generating means for counting the pulses to produce said digital signal.

12. A constant rate feeder comprising, in combination, first means driven at a constant speed for delivering material, second means for measuring weight deviation from a desired weight of the material upon the first means and for continuously averaging instantaneous errors in weight of material on and delivered by the first means, a feeder for feeding the material onto the first means, and a control for said feeder, said control being responsive to said second means and continuously controlling said feeder to maintain said constant rate.

References Cited in the file of this patent
UNITED STATES PATENTS

| 2,322,218 | Baird | June 22, 1943 |
| 2,796,197 | Criddle | June 18, 1957 |
| 2,962,150 | Haley | Nov. 29, 1960 |
| 2,990,937 | Goslin | July 4, 1960 |
| 3,062,408 | Boudan | Nov. 6, 1962 |
| 3,067,939 | Ziffer | Dec. 11, 1962 |